Sept. 21, 1926.

W. WRIGHT 1,600,859

RETAINING VALVE BRACKET

Filed Sept. 8, 1925    2 Sheets-Sheet 1

Inventor
William Wright.

By Edwin S. Clarkson
Attorney

Sept. 21, 1926.  
W. WRIGHT  
1,600,859  
RETAINING VALVE BRACKET  
Filed Sept. 8, 1925   2 Sheets-Sheet 2

Inventor  
William Wright  
By Edwin S. Clarkson  
Attorney

Patented Sept. 21, 1926.

1,600,859

UNITED STATES PATENT OFFICE.

WILLIAM WRIGHT, OF CHICAGO, ILLINOIS.

RETAINING-VALVE BRACKET.

Application filed September 8, 1925. Serial No. 55,011.

The retaining valve is part of the air brake system and functions to retain a certain part of the brake cylinder pressure to aid in retarding the acceleration of a train in descending long grades while the brake pipe pressure is increased after one application to recharge the auxiliary reservoirs.

This valve is usually bolted directly to the end wall of a car with the heads of the bolt on the inside of the car. It is not an unusual thing for the air pipe to break where it enters the valve, in which event the valve must be removed from the car, and if the car happens to be loaded the load must be removed from one end of the car to remove the bolts or to keep them from turning when the nuts are backed off the bolts. Under the present system, when a pipe breaks it is necessary to place a new pipe from the union under the car to the valve, or place the bolts lower on the car wall necessitating the making of new holes in the car wall and plugging the old holes, which, of course, is objectionable.

One of the objects of my invention is to provide a bracket for the retainer valve which can be readily and permanently secured to the car wall to which the valve may be detachably secured and provide means whereby the valve may be secured in various adjusted positions as circumstances may demand, all of which is accomplished without entering the car.

Figure 1:
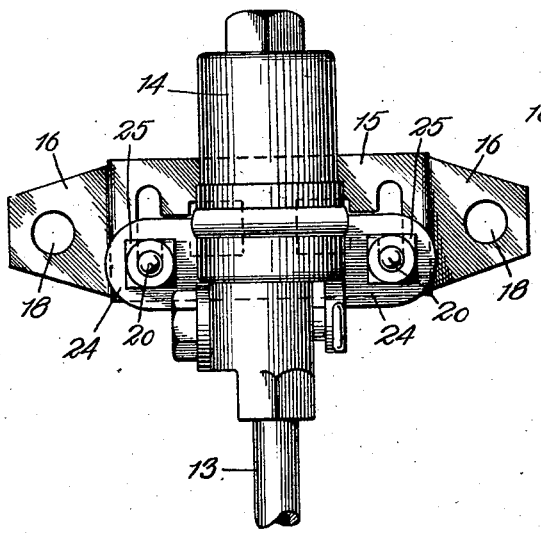
Figure 1 is a front elevation of my anchor with a retaining valve mounted thereon.
Figure 2:
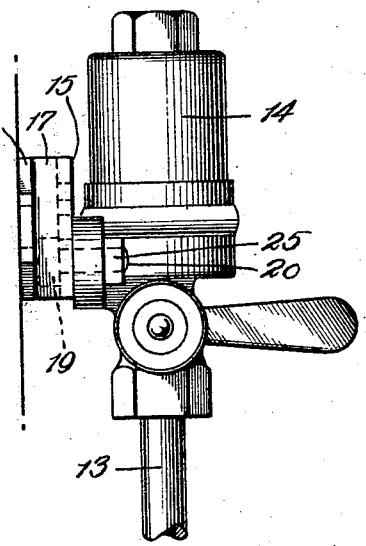
Figure 2 is a side elevation of Figure 1.
Figure 3:
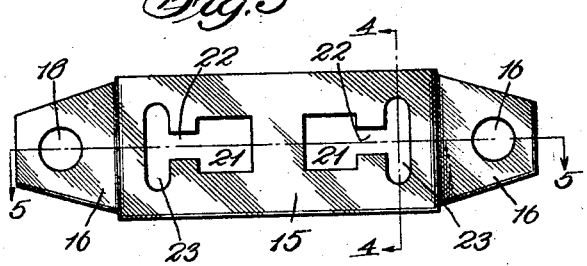
Figure 3 is a front elevation of my anchor.
Figure 4:
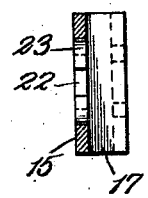
Figure 4 is a sectional view on the line 4—4, Figure 3.
Figure 5:
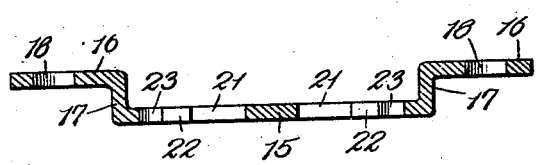
Figure 5 is a sectional view on the line 5—5, Figure 3.
Figure 6:
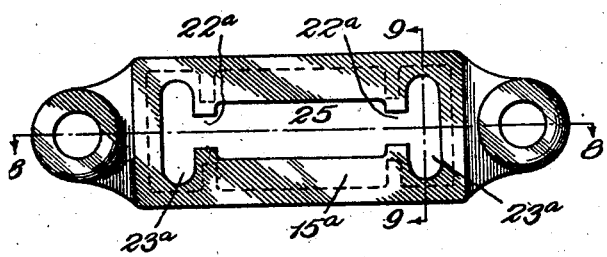
Figure 6 is a front elevation of another embodiment of my invention
Figure 7:
Figure 7 is a side elevation of Figure 6.
Figure 8:
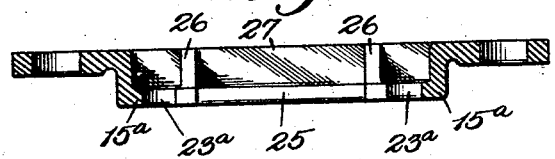
Figure 8 is a sectional view of Figure 6 on the line 8—8.
Figure 9:
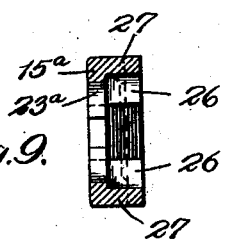
Figure 9 is a sectional view on the line 9—9, Figure 6.

The reference numeral 13 designates the air pipe to the upper end of which is secured the retaining valve 14.

Referring to Figures 1 to 4, of the drawing, my retaining valve or bracket comprises a center plate 15 provided with, laterally extending arms 16 at its end which are secured to the plate 15 by means of spacing members 17, the arms 16 having suitable bolt or rivet openings 18 through which bolts or rivets pass to secure the anchor, or bracket, to the car wall permanently and when so secured the plate 15 is spaced from the car wall in which space the heads 19 of the bolts 20 are positioned.

The plate 15 is provided with rectangular openings 21 through which the head 19 of the bolt may pass and from one side of this opening 21 extends a slot 22 which opens into a vertical elongated slot 23, whereby the bolt 20 may be slipped from the opening 21 through the slot 22 and into the elongated slot 23, the elongated slot being smaller than the head of the bolt.

After the bolts 20 are in the slots 23 the bolt openings usually provided in the lugs 24 are aligned with the bolts 20 and pushed toward the bracket after which the nuts 25 are screwed on the bolts 20 until the valve is firmly bolted on the plate 15.

Usually in the first installation the bolts 20 are positioned in the upper end of the elongated slot 23 so that that may be placed in a lower position in said slot to accommodate a shortening of the pipe 13 without disturbing the position of the anchor on the car.

It will be readily seen that by simply removing the nuts 25 the valve may be removed from the bracket or anchor.

The only difference in construction in Figures 6 to 9 from that shown in Figures 1 to 5 is that I provide a bolt opening 25 that is common to both slots 22ª, the elongated slots 23ª being the same. I also provide the plate 15ª with ribs 26 and upper and lower rearwardly extending flanges 27 thereby increasing the bearing of the bracket on the car wall.

Figure 10:
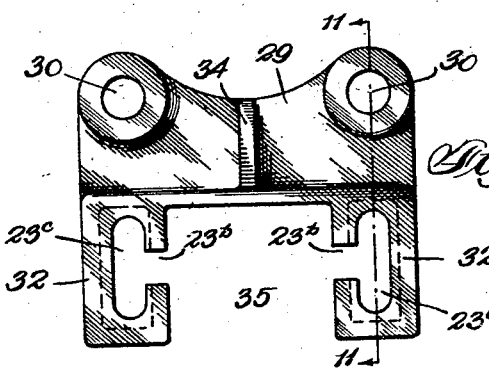
Figure 10 is a front elevation of another embodiment of my invention.
Figure 11:
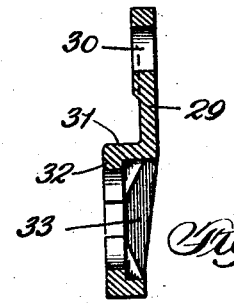
Figure 11 is a sectional view on the line 11—11, Figure 10.
Figure 12:
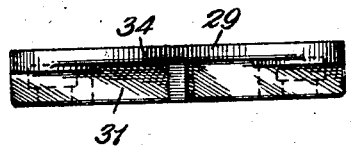
Figure 12 is a top plan view of Figure 10.

In Figures 10 to 12 the anchor comprises a hanger plate 29 having bolt openings 30 therethrough to receive bolts to secure it to the car. At the lower end of this plate 29 is a forwardly extending shelf 31 from the outer edge of which depends an apron 32, there being ribs 33 extending from the lower edge of the plate to the lower edge of the apron. A rib 34 also extends between the shelf 31 and the plate 29.

As will be seen in Figure 10 there is an enlarged space 35 open at the bottom and common to the slots 23$^b$ to facilitate the movement of the bolts 20 toward the slots 23$^b$ and the elongated slots 23$^c$.

It will be observed that in all of the embodiments there is provision for passing the rectangular head of the bolt 20 back of the front plate of the anchor whereby the bolts may be moved toward the ends of the anchor through slots and into the elongated slots and that in each instance the head of the bolt is wider than the elongated slots so that there is no danger of the heads pulling out through said elongated slots.

What I claim is:

A bracket for a retaining valve including a plate, elongated vertically disposed slots near the ends of said plate, a slot extending sidewise from the elongated slots, and a bolt head opening in communication with said sidewise extending slots.

In testimony whereof I affix my signature.

WILLIAM WRIGHT.